United States Patent
Pezaris

(10) Patent No.: US 8,128,337 B2
(45) Date of Patent: Mar. 6, 2012

(54) OMNIDIRECTIONAL VERTICAL-AXIS WIND TURBINE

(76) Inventor: Constantine D Pezaris, Nahant, MA (US)

( * ) Notice: Subject to any disclaimer, the term of this patent is extended or adjusted under 35 U.S.C. 154(b) by 0 days.

(21) Appl. No.: 12/535,771

(22) Filed: Aug. 5, 2009

(65) Prior Publication Data

US 2011/0033288 A1    Feb. 10, 2011

(51) Int. Cl.
*F03D 3/04* (2006.01)
(52) U.S. Cl. .......... 415/4.2; 415/4.4; 415/224; 415/191; 416/198 R; 416/175
(58) Field of Classification Search ............ 415/4.2, 415/4.4, 191, 224; 416/203, 198 R, 175
See application file for complete search history.

(56) References Cited

U.S. PATENT DOCUMENTS

| | | | | |
|---|---|---|---|---|
| 15,714 | A | * | 9/1856 | Whitman ................... 415/4.3 |
| 1,519,447 | A | * | 12/1924 | Fortier-Beaulieu .......... 415/186 |
| 1,545,633 | A | * | 7/1925 | Bender ....................... 415/4.4 |
| 4,421,452 | A | * | 12/1983 | Rougemont .................. 415/4.2 |
| 4,433,544 | A | * | 2/1984 | Wells et al. ................ 60/641.12 |
| 4,452,046 | A | * | 6/1984 | Valentin ..................... 60/641.11 |
| 4,457,666 | A | * | 7/1984 | Selman, Jr. ................. 415/203 |
| 4,508,973 | A | | 4/1985 | Payne |
| 4,606,697 | A | | 8/1986 | Appel |
| 5,391,926 | A | | 2/1995 | Staley et al. |
| 5,664,418 | A | * | 9/1997 | Walters ....................... 60/398 |
| 6,249,059 | B1 | | 6/2001 | Hosoda |
| 6,465,899 | B2 | | 10/2002 | Roberts |
| 6,755,608 | B2 | | 6/2004 | Boughton |
| 6,921,986 | B2 | | 7/2005 | Bayer |
| 7,189,050 | B2 | | 3/2007 | Taylor et al. |
| 7,329,965 | B2 | | 2/2008 | Roberts et al. |
| 7,400,057 | B2 | | 7/2008 | Sureshan |
| 7,866,938 | B2 | | 1/2011 | Kariya |
| 2003/0156938 | A1 | | 8/2003 | Verini |

FOREIGN PATENT DOCUMENTS

| | | |
|---|---|---|
| JP | 2004-190506 A | 7/2004 |
| JP | 2005-299621 A | 10/2005 |

OTHER PUBLICATIONS

PCT Written Opinion of the International Searching Authority dated Apr. 28, 2011, International Application No. PCT/US2010/044531.

* cited by examiner

*Primary Examiner* — Edward Look
*Assistant Examiner* — Jesse Prager
(74) *Attorney, Agent, or Firm* — George A. Herbster

(57) ABSTRACT

A two-stage, omnidirectional vertical axis wind turbine includes a first chamber in which a plurality of angularly spaced horns guide wind from any side of the wind turbine into a chamber to rotate a first rotor. Wind exiting the first rotor passes through a diverter to produce laminar flow. A fan attached to the shaft intercepts this laminar flow to add additional torque to the shaft.

16 Claims, 5 Drawing Sheets

OMNIDIRECTIONAL VERTICAL-AXIS WIND TURBINE

BACKGROUND OF THE INVENTION

1. Field of the Invention

This invention generally relates to wind-driven power generators. More specifically, this invention relates to omnidirectional vertical-axis wind turbines adapted for driving a variable speed, constant frequency electric power generators and other utilization devices.

2. Description of Related Art

There is increasing interest in developing apparatus for converting wind energy into electric power. Diverse implementations of various concepts have included conventional windmills. However, conventional windmills are unidirectional. That is, they are most efficient only when the axis of rotation of the windmill aligns with the wind direction. Therefore to be efficient a windmill must include some means for aligning the windmill's blades by rotating the axis of rotation about a vertical axis.

Aligning such a rotating mass requires significant power. As wind direction constantly fluctuates, correction must be applied essentially continuously. The power required to rotate or position the rotating windmills decreases the overall efficiency of the system. In some situations where the wind direction fluctuates rapidly, such aligning means may be unable to react in a timely fashion. Therefore, the efficiency is further reduced.

These issues have led others to develop turbines that operate about horizontal or vertical axes. Each has advantages and disadvantages. The primary disadvantage of horizontal axis wind turbine is that it is not omnidirectional. Some alignment means must be still be provided to align the wind turbine about a vertical axis.

To overcome these disadvantages of conventional windmills and horizontal axis turbines, effort has been placed into the development of wind turbines with wind-driven blades that rotate about vertical axes and that do not require a structure for rotating the entire mechanism for aligning the wind turbine with the wind direction. For example, For U.S. Pat. No. 4,508,973 to Payne discloses a wind-operated electrical generator system with a stationary circular arrangement of segmental wind inlet passages. Each passage has vertical inlet openings and inwardly and upwardly curving walls. The lower and upper walls form an inwardly and upwardly extending convergence to form constricted upwardly directed exit passage that merges into a Venturi throat. A bladed impeller mounts in the throat and responds to the wind in the throat that is characterized by increased wind speed to rotate a that impeller in the throat.

U.S. Pat. No. 5,391,926 to Staley et al. discloses a wind turbine adapted for high-wind conditions. Fixed stators direct wind currents having horizontal components into a rotor assembly. Rotors in this assembly respond to the wind currents by imparting rotation upon a central vertical shaft. The stators are designed with a double-curve which perform at levels higher than either straight or single-curve stators. Thus the structure is stated to be adapted for operation with high-energy potential winds.

U.S. Pat. No. 7,189,050 to Taylor et al. discloses a cross-flow wind turbine in which an air foil stator accelerates wind along its surface and creates a low pressure area on the leading face of a rotor blade during a power stroke. A blocking stator prevents wind from impeding the movement of the rotor blades during the return cycle and drives wind under the trailing face of the rotor blades during the power cycle. This creates a large pressure differential between the leading and trailing faces of the rotor blade during the power cycle. In some embodiments gaps are provided between the inside edge of the rotor blade and the stationary shaft to vent wind collected by the rotor blade during certain portions of the rotation cycle. This vented wind increases the pressure on the trailing face of the rotor blades during a return cycle.

U.S. Pat. No. 7,329,965 to Roberts discloses an aerodynamic-hybrid, vertical-axis wind turbine that includes a rotor air foil and stator blade combination. This structure increases wind velocity and pressure while eliminating back pressure and improving the laminar flow of wind around and through the device. Each rotor air foil has a horizontal cross section with a crescent shape including a convex leading side and a concave trailing side with a thicker middle section. Each stator blade has a horizontal cross-section with a planar side and a convex side. Each rotor air foil and stator blade combination is secured between upper and lower annular sails.

U.S. Pat. No. 7,400,057 to Sureshan discloses an omnidirectional wind turbine that includes a throat section that has an air foil, multi-bladed rotor. The intake of a shroud incorporates multiple horizontally curved blades of torroidal form varying up to nearly twice the size of the rotor diameter. These are stacked, staggered and secured in place by multiple aerodynamic vertical walls in the radial direction. Wind is collected in a central collection chamber. Blade curving angles and stacking arrangement are established to accelerate and focus the wind across the full swept area of the rotor blades.

U.S. Patent Pub. 2003/0156938 to Verini discloses apparatus for capturing and harnessing wind energy. A tower has the form of an elongated vertical conduit. A wind collector at a first end portion of the conduit deflects the wind into the conduit to create an axial flow toward the second end that carries a wind turbine mounted for rotation about a vertical axis.

Each of these designs has specific deficiencies. A number, including conventional windmills, are inefficient in converting the wind's energy into energy that rotates a shaft connected to an electric power generator or other utilization device. Each is a single-stage structure that can not convert all the energy, so considerable unconverted energy remains in the exhaust.

What is needed an omnidirectional vertical axis turbine that extracts the maximum energy from the wind for driving a mechanical or electrical utilization device, such as a variable speed, constant frequency, power generator.

SUMMARY

Therefore it is an object of this invention to provide an omnidirectional vertical-axis wind turbine that maximizes the extraction of wind energy for conversion to mechanical energy applied to a utilization device, such as an electric power generator.

Another object of this invention is to provide an omnidirectional vertical-axis wind turbine that operates over a wide range of wind velocities.

Still another object of this invention is to provide an omnidirectional vertical-axis wind turbine that overcomes the deficiencies in prior art.

Yet another object of this invention is to provide an omnidirectional vertical-axis wind turbine that is readily implemented and installed with minimal expense and site development.

In accordance with this invention an omnidirectional vertical-axis wind turbine comprises a base with two vertically juxtaposed and interconnected chambers. A vertical shaft extends through the chambers for rotation about a vertical axis. A horn structure connects to the base and has inputs for receiving the wind from different directions and outputs for directed the received wind to a first of the two chambers. A first energy converter in the first chamber is attached to the shaft to convert wind energy into a first component of mechanical energy that rotates the shaft. The remaining wind is then redirected toward a second chamber as an exhaust with vertical and rotational velocity components. As the wind passes from the first and second chambers it is redirected to produce a substantially laminar flow toward the second chamber. A second energy converter in the second chamber is attached to the shaft and converts the energy in this exhaust into a second component of mechanical energy that transfers to the shaft to increase the total mechanical energy for rotating the shaft.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
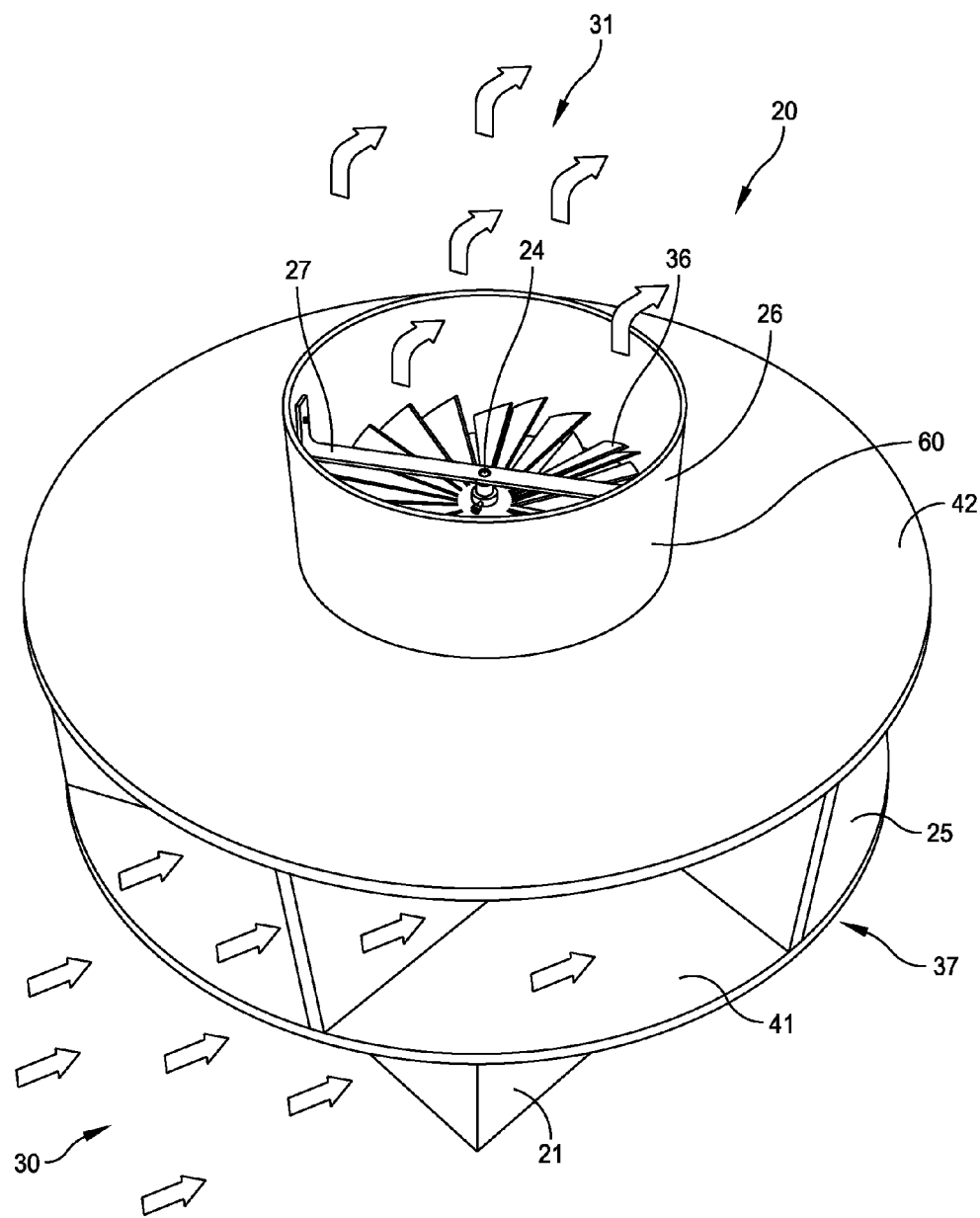
FIG. 1 is a perspective view of an embodiment of this invention.
Figure 2:
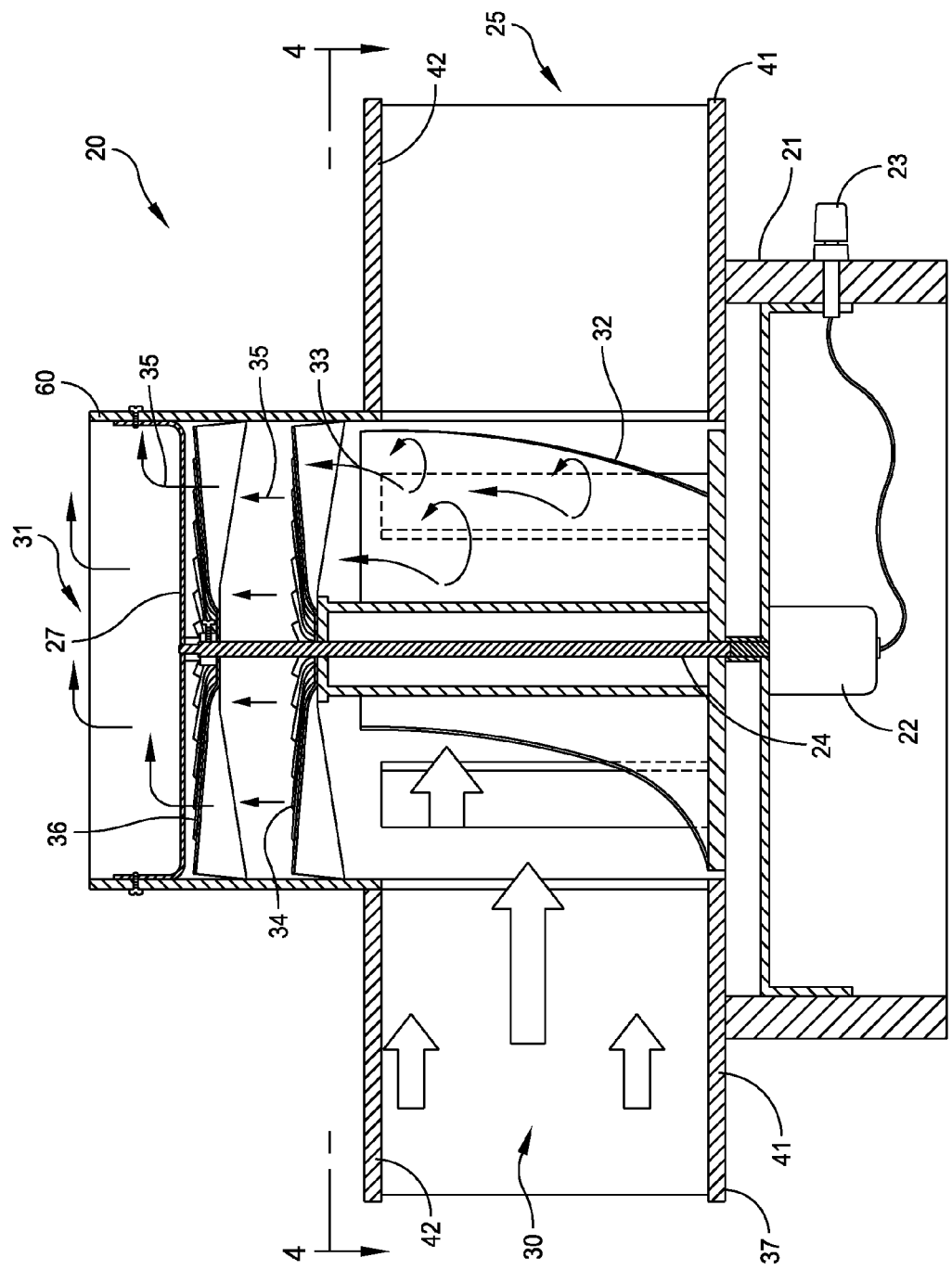
FIG. 2 is a vertical cross-section taken through FIG. 1.

FIGS. 1 and 2 are perspective and cross-sectional views of one embodiment 20 of a two-stage omnidirectional vertical-axis wind turbine embodying this invention. A base 21 supports the wind turbine on some supporting foundation (not shown). In this embodiment the base 21 also supports a variable speed, constant frequency electric power generator 22 connected to external power connection 23. Specific examples of such variable speed, constant frequency power generation equipment and any other mechanical utilization devices are well known in the art and will be selected based upon well-known design parameters.

The base 21 supports a first, or lower, chamber 25 and a second, or upper, chamber 26. A vertical shaft 24 extends from the electric power generator 22 through the first chamber 25 into the second chamber 26 to be supported by an end structure represented as a transverse bracket 27 attached to the walls of the second chamber 26.

In broad terms, as inlet wind 30 enters a portion of the first chamber 25 and exhausts from the chamber 26 to be entrained with wind that bypasses the wind turbine 20 as represented by the arrows 31. A first rotor 32, shown in FIG. 2 and attached to the shaft 24, converts a portion of energy in the incoming wind 30 into mechanical energy that rotates the shaft 24. The wind exiting the first chamber 25 is "primary exhaust air" 33 that has both vertical and angular velocity components.

A diverter 34 at the boundary between the first and second chambers 25 and 26 redirects the primary exhaust air 33 into vertically moving "laminar exhaust air" 35. The laminar exhaust air 35 then passes through a second rotor in the form of a fan 36 attached to the shaft 24. The fan 36 converts kinetic energy in the laminar exhaust air 35 into rotary energy that, by virtue of the attachment to the shaft 24, supplements the energy supplied by the first rotor 32. That is, the first and second rotors act together to convert a significant portion of the energy in the wind entering the omni-direction, vertical axis wind turbine 20 of this invention. Consequently, the energy in the exhaust wind represented by the arrows 31 is quite low.

First Chamber 25

Figure 4:
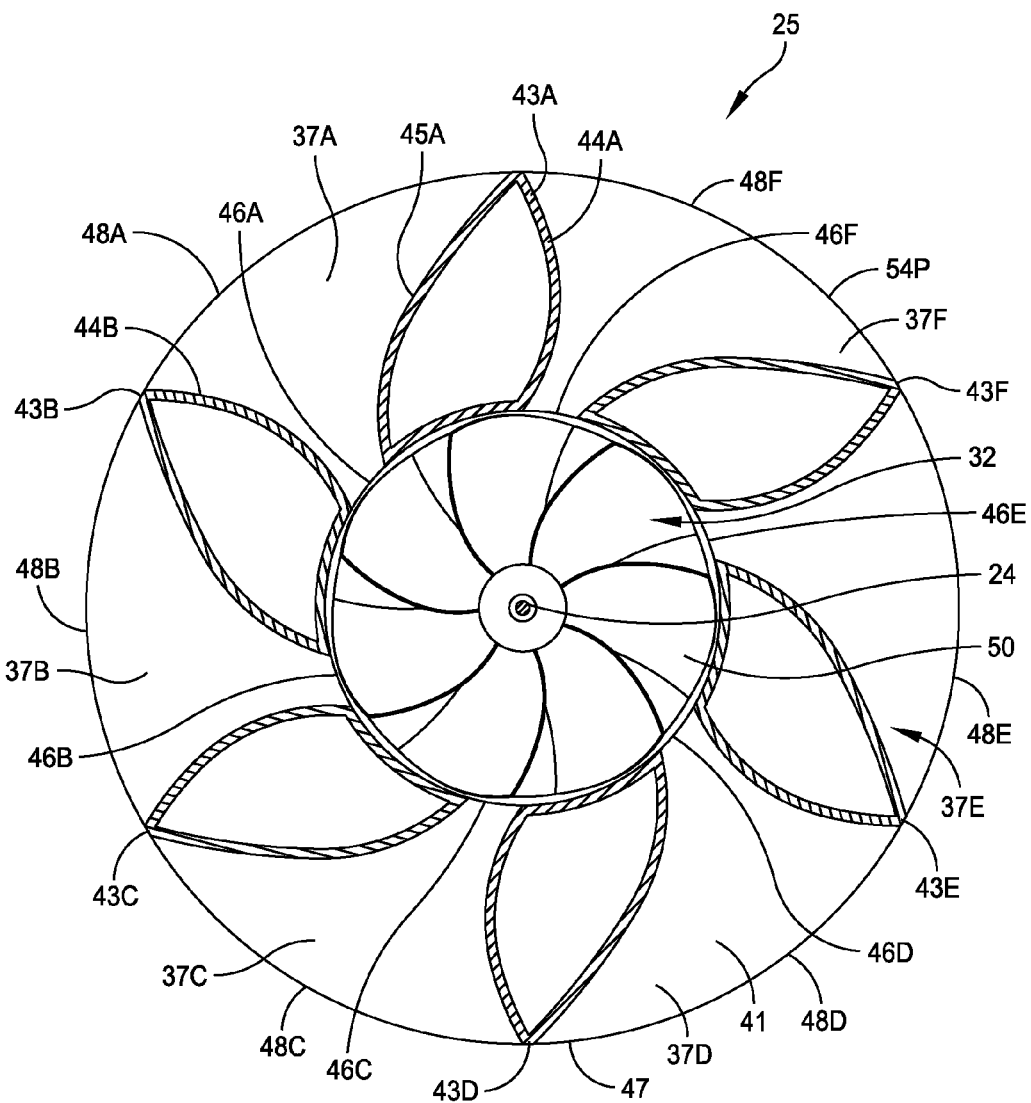
FIG. 4 is a cross-section taken along lines 4-4 in FIG. 2.

As will now be described in detail, the first chamber 25 includes a stationary horn structure 37 and the first rotor 32 that convert wind energy into rotation of the shaft 24. Referring to FIGS. 2 and 4, the horn structure 37 is bounded by an annular floor 41 and an annular ceiling 42. Their central openings define the periphery of the first rotor chamber 40.

The horn structure 37 includes equiangularly spaced, radially extending dividing partitions, dividing partitions 43A through 43F in this embodiment. Other pluralities could be used. Each dividing partition has a similar structure. The dividing partition 43A in FIG. 4, for example, comprises walls 44A and 45A. Each of the walls 44, such as the wall 44A, has a parabolic shape to promote inwardly directed air flow from a mouth to a throat, such as from the mouth 48F to a throat 46F.

The wall 45A has a parabolic shape and extends toward and defines one boundary of a throat 46A. A chord of the wall 44A lies along a radius. A chord of the wall 45A extends between the outer edge of the wall 44A and an edge of the throat 46A. In this embodiment, the distance between the walls 45A and 45B at the throat 46A corresponds to about one-half the pitch distance between adjacent blades of the first rotor 32, such as blades 50A and 50B in FIGS. 3 and 4 proximate a throat. In other embodiments throat size and dividing partition construction and spacing may vary.

Figure 5:
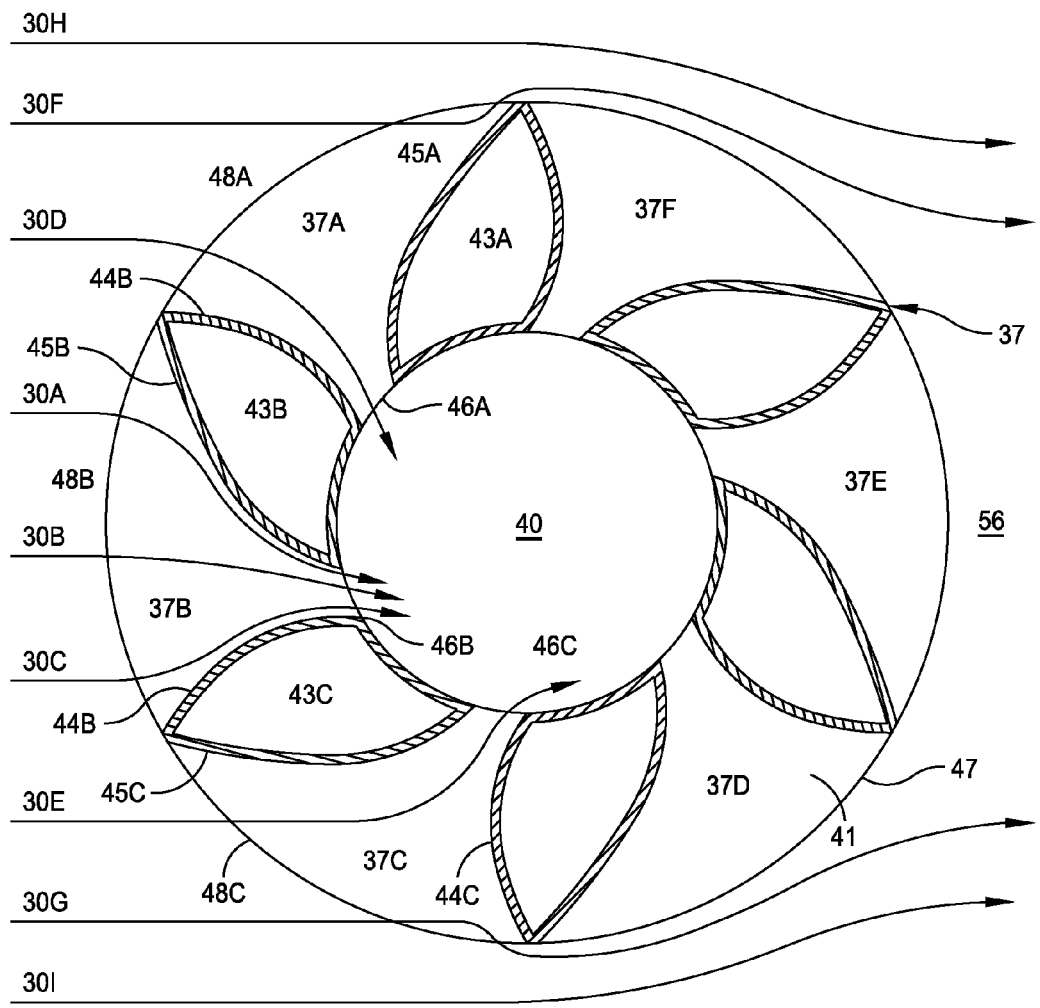
FIG. 5 is a cross-sectional view illustrating air flow into a horn structure as shown in FIG. 4.

FIG. 5 is a cross-section corresponding to that in FIG. 4 with the first rotor 32 removed to facilitate an understanding of air flow and the operation of the horn structure 37. Each horn, such as the horn 37B, has certain characteristics. As known in the acoustic art, an acoustic driver were placed at the throat 46B, it would pressurize the air which would flows from the mouth 48B with a substantially reduced pressure. This effect is reversible. That is, wind that enters the mouth 48B will have an increased pressure at and flow velocity through the corresponding throat 46B with some compression.

The orientation of the walls that form each horn, such as walls 45B and 44B that form the horn 37B, direct the air such that it exits the throat in a direction that is essentially normal to the position of a blade as it passes the throat. The result is that the horn 37B accelerates the air and compresses it thereby increasing its density and directs it against the rotor blade along an optimal flow path for maximum energy transfer thereby to cause the rotor blade to rotate.

This is shown particularly in FIG. 5 with respect to air flows 30A, 30B and 30C that are redirected to establish a flow path essentially normal to a rotor blade as the outer leech is rotating past a corresponding throat. Airflows represented by 30D and 30E enter the horns 37A and 37C respectively and due to their positions are directed through their corresponding throats 46A and 46C. Air flows 30F and 30G strike the outer edges of the walls 45A and 44C, respectively and are deflected essentially away from the rotor 32. Wind outside this range as represented by arrows 30H and 30I bypasses the horn structure 37 completely.

Only windward horns, such as windward horns 37A, 37B and 37C in FIGS. 4 and 5, produce power. As will be apparent, a low pressure area 56 will be created to the lee of the horn structure 37. Low pressure in the area 56 will not have any effect on the rear horns such as horns 37D, 37E and 37F because the pressure at in the area 56 will be less than the pressure at the corresponding throats of those horns.

FIG. 5 depicts the one direction of air flow. As will be apparent as the wind rotates about the horn structure 37 different horns will come into play. Essentially, however, in any wind direction multiple horns will be involved to some extent in the transfer of wind into contact with rotor blades passing their respective throats. Consequently essentially all the wind striking the horn structure from one direction will be redirected and converted into rotary energy.

Figure 3:
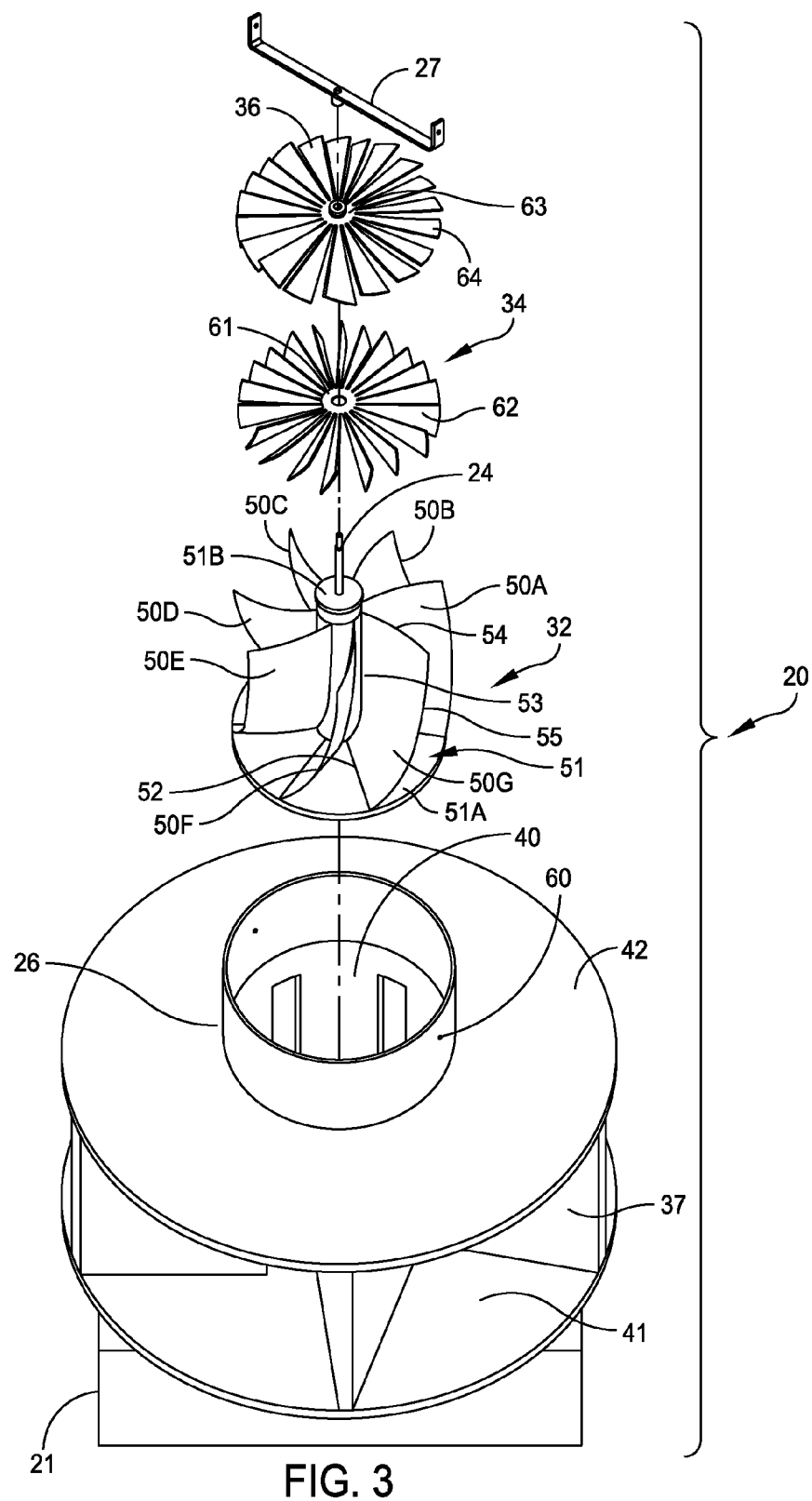
FIG. 3 is an exploded view of the embodiment of FIG. 1.

Referring to FIG. 3, the rotor 32 includes a support structure 51 with an annular end plate 51A and a central axially extending hub 51B affixed to the shaft 24. Each blade has a basic sail shape. Looking at blade 50G as an example, a bottom edge or foot 52 extends radially from the central hub 51B. An inner edge or luff 53 has a parabolic shape with a substantially vertical orientation and is affixed to the hub 51B. An upper edge or head 54 is a slightly curved and at an angle to displace it downwind from the radius of the foot 52. This contributes to the draft of the blade 50F. An outer edge or leech 55 extends between the outer ends of the foot 52 and the head 54. The leech 54 also has a parabolic form that completes the shape with a final draft of the blade that maximizes its interaction with any wind that strikes it. Thus wind striking a rotor blade produces an angular force and deflects vertically upward. Consequently the primary exhaust air 33 exiting the rotor 32 has both a vertical component and an angular component.

In this embodiment, the horn structure 37 includes six horns while the rotor 32 includes seven blades. The numbers of horn structures and rotor blades can be varied. In a preferred form, however, the number of horn structures will differ from the number of rotor blades. This feature provides a more even transfer of energy so that the rotating force on the shaft 24 does not fluctuate.

The wind turbine of this invention can operate in a variety of wind conditions. Mechanically it has a low profile and can be easily mounted to a foundation that is stable in high winds. Moreover, as the wind increases in velocity, it will reach a level that "overpowers" the horns. That is, as the pressure produced by the wind increases, it will reach a value where the throat acts as a flow limit. As the wind increases, wind will be impeded from entering the horns and will spill around the horn structure.

Diverter 34

FIGS. 2 and 3 most clearly disclose the diverter 34 that is positioned in a shroud 60 at the bottom of the second chamber 26. The diverter 34 includes a central hub 61 that is journaled on the shaft 24 so the shaft 24 can rotate while the diverter 34 is angularly fixed in space. The diverter 34 includes angularly spaced, radially extending vertical fins 62 thereby to provide vertical tapered passages for receiving the primary exhaust air 33. Each of the fins 62 has a height that tapers from a minimum at the hub 61 to a maximum at the periphery. This taper allows the diverter 34 to block or at least redirect wind with an angular component into a vertical component. The tapered fins 62 provide a simple means for enabling a greater effect at the outer periphery where the angular momentum will be greater. As a result the exhaust air 35 leaving the diverter 34 has a substantially vertically upward, laminar flow path.

In this embodiment, the fins 62 extend to free ends. A ring or other reinforcement could be attached to the periphery of the fins 62 to strengthen the diverter 34 and provide a means for attaching the diverter to the shroud 60.

Second Chamber 26

Referring to FIG. 3, the shroud 60 defines the periphery of the cylindrical chamber 26 and carries the support 27 for the upper end of the axially extending shaft 24. The fan 36 has a central hub 63 that is affixed to the shaft 24. A plurality of angularly spaced fins 64 extend radially from the central hub 63 to free ends proximate the periphery of the second chamber 26 as defined by the shroud 60. Each of the fins 64 has a width that tapers from a minimum at the central hub 63 to a maximum at the free end thereof. In addition, each fin is twisted angularly to achieve a maximum angle of attack with respect to the wind in the second chamber 26.

Thus the laminar exhaust air 35 from the diverter drives the fan 36. Moreover, as wind passes over the top of the shroud 60, it produces another low pressure area. This further increases the wind velocity through the fan 36. The fan 36 therefore provides additional torque to the shaft 24 before exiting the top of the wind turbine 20 as the exhaust wind 31 to be entrained with the passing wind.

OPERATION

As will now be apparent, wind entering from any direction enters windward facing horns in the horn structure 37. The wind is directed and accelerated in the horns to impinge rotor blades, or sails, 50 on the first rotor 32 and the first rotor chamber 40 thereby to impart rotation to the first rotor 32. Residual pressurize air exiting the first rotor 40 with its angular momentum and various eddies is then converted to a near laminar flow parallel to the rotating shaft by the diverter 34. Wind exiting the diverter 334 impinges the fins on the second stage rotor 36 to produce additional power.

It has been found that this structure has the characteristic of supplying significant power for the overall volume of the wind turbine. Particularly, the combination of the horn structure and the first rotor with its sail-shaped blades allows the wind entering the horn structure to have an increased pressure and velocity. This, in turn, allows a significant percentage of the wind energy to be converted into mechanical energy.

As will now be apparent a two-stage omnidirectional vertical axis wind turbine constructed in accordance with this invention provides the various advantages of this invention. It maximizes the extraction of wind energy for conversion to mechanical energy as applied to a utilization device, such as an electric power generator. It will operate over a wide range of wind velocities. The process overcomes the previously stated deficiencies in prior systems. A wind turbine constructed in accordance with this invention is easy to implement and install with minimal expense and site development.

This invention has been presented in terms of one embodiment. It will be apparent that a number of variations and modifications can be made to this invention as specifically disclosed. The base 21, generator 22 and power outlet 23 are representative. Specific construction of such a base and generator can be varied. Other utilization devices could be substituted for the electric power generator 22. These include mechanical devices. A direct connection is shown between the shaft 24 and the electric power generator 22. It is assumed that some gearing will also be included. Specific structures for the dividing partitions 43 have also been disclosed. Again, it will be apparent that the number of dividing partitions and the numbers of rotor blades can be altered for various conditions. Different implementations of the diverter and the fan 36 could also be substituted. Therefore, it is the intent of the appended claims to cover all such variations and modifications as come within the true spirit and scope of this invention.

What is claimed as new and desired to be secured by Letters Patent of the United States is:

1. An omnidirectional, vertical-axis two-stage wind turbine comprising:
    A) a base that forms first and second vertically juxtaposed and interconnected chambers, said first chamber being below said second chamber,
    B) a shaft connected to said base and extending vertically through said first and second chambers for rotation about a vertical axis,
    C) a plurality of angularly spaced horns connected to said base about the periphery of a first of said two chambers, each horn having an outer mouth and an inner throat whereby the pressure and velocity of the wind at the inner throat is greater than the pressure and speed of the wind entering the outer mouth,
    D) first energy conversion means in said first chamber and fixed to said shaft for converting energy of the wind exiting said horns into a first component of mechanical energy for rotating said shaft and for deflecting the wind toward said second chamber as a primary exhaust air with vertical and angular velocity components,
    E) stationary redirection means intermediate said first and second chambers and fixed to said base for redirecting the primary exhaust air to produce a substantially laminar upwardly vertical flow toward said second chamber, said redirection means including:
        i) a central hub concentrically mounted with said shaft whereby said shaft is free to rotate relative to said redirection means, and
        ii) a plurality of angularly spaced, radially extending fins forming vertical passages between said central hub and said base intermediate said first and second chambers, and
    F) second energy conversion means in said second chamber and fixed to said shaft for converting the energy in the laminar exhaust from said redirection means into a second component of mechanical energy that transfers to said shaft thereby to increase the total mechanical energy transferred to said shaft.

2. An omnidirectional, vertical-axis wind turbine as recited in claim 1 wherein said base includes utilization means for connection to said shaft.

3. An omnidirectional, vertical-axis wind turbine as recited in claim 1 wherein each said horn diverges from said inner throat proximate to the outer mouth.

4. An omnidirectional, vertical-axis wind turbine as recited in claim 3 wherein said first energy conversion means includes
    i) a hub attached to said shaft,
    ii) a plurality of equiangularly spaced blades extending radially from said hub to intercept wind from at least one of said horns.

5. An omnidirectional, vertical-axis wind turbine as recited in claim 4 wherein said pluralities of blades and horns are unequal.

6. An omnidirectional, vertical-axis wind turbine as recited in claim 4 wherein each of said blades has a sail shape with a height corresponding to the height of said first chamber and with a draft that receives wind from a throat.

7. An omnidirectional, vertical-axis wind turbine as recited in claim 6 wherein each said horn and throat has a height corresponding to the height of said blades and said throat has a width corresponding to about one-half the distance between adjacent blades proximate said throat.

8. An omnidirectional, vertical-axis wind turbine as recited in claim 1 wherein each of said horns comprises a plurality of angularly spaced, radially extending dividing partitions, adjacent ones of said dividing partitions forming the mouth and the throat.

9. An omnidirectional, vertical-axis wind turbine as recited in claim 8 wherein each dividing partition includes a first generally radially extending wall extending from one side of one throat to the periphery and a second skewed wall extending from the other side of an adjacent throat to the first wall at its periphery.

10. An omnidirectional, vertical-axis wind turbine as recited in claim 9 wherein at least one said walls has a parabolic shape to direct the wind from the mouth to the throat.

11. An omnidirectional, vertical-axis wind turbine as recited in claim 9 wherein each of said walls has a parabolic shape to direct the wind from the mouth of a horn to the throat along a flow path that is substantially normal to a blade at the throat.

12. An omnidirectional, vertical-axis wind turbine as recited in claim 1 wherein each of said fins has a depth that increases from a minimum adjacent said hub to a maximum at outer ends thereof.

13. An omnidirectional, vertical-axis wind turbine as recited in claim 1 wherein said second energy conversion means includes a fan attached to said shaft.

14. An omnidirectional, vertical-axis wind turbine as recited in claim 13 wherein said fan includes:
    i) a central hub attached to said shaft, and
    ii) a plurality of angularly spaced fins extending radially from said central hub to a point proximate the periphery of said second chamber.

15. An omnidirectional, vertical-axis wind turbine as recited in claim 14 wherein each of said fins has a width that increases from a minimum adjacent said central hub to a maximum at the outer end thereof.

16. An omnidirectional, vertical-axis wind turbine as recited in claim 15 wherein each of said fins is twisted to be inclined with respect to the shaft axis.

* * * * *